L. A. PLUMB.
Lamp Stove.
No. 61,863.
Patented Feb. 5, 1867.
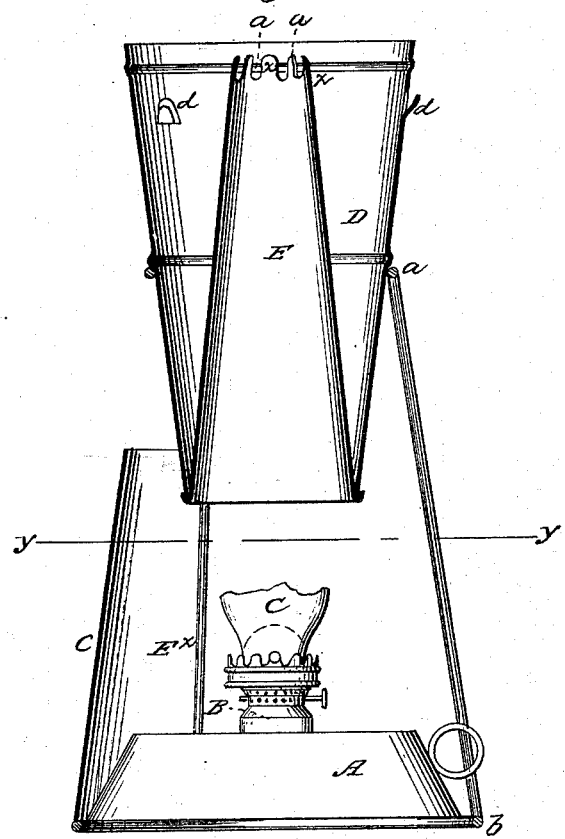
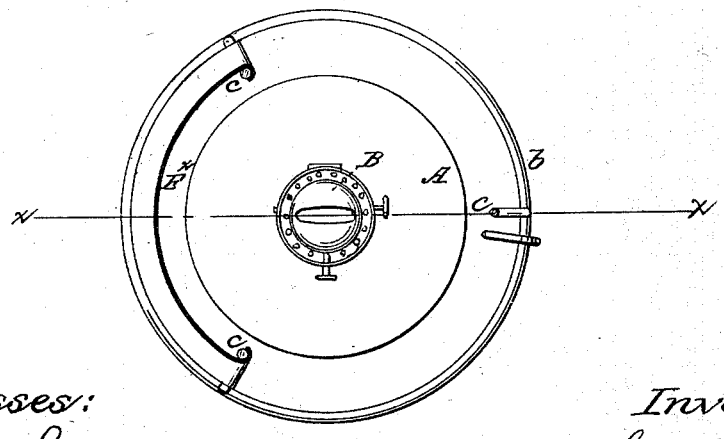
Witnesses:
Inventor:

United States Patent Office.

LUKE A. PLUMB, OF BIDDEFORD, MAINE.

*Letters Patent No. 61,863, dated February 5, 1867.*

---

NURSE STOVE.

---

*The Schedule referred to in these Letters Patent and making part of the same.*

---

TO ALL WHOM IT MAY CONCERN:

Be it known that I LUKE A. PLUMB, of Biddeford, in the county of York, and State of Maine, have invented a new and improved Nurse Stove; and I do hereby declare that the following is a full, clear, and exact description thereof, which will enable those skilled in the art to make and use the same, reference being had to the accompanying drawings, forming part of this specification, in which—

Figure 1 is a vertical central section of my invention, taken in the line $x\,x$, fig. 2.

Figure 2, a horizontal section of the same, taken in the line $y\,y$, fig. 1.

Similar letters of reference indicate corresponding parts.

This invention relates to a new and improved portable-lamp stove, designed more especially for the nursery, and for heating substances in a small way. The object of the invention is to obtain a device for the purpose specified, by which the benefit of both the light and heat radiated from the lamp may be obtained, and have a more simple, convenient, and desirable article for the nursery than those hitherto used.

A represents the body or fountain of a lamp, which may be of metal or other suitable material, and is provided with a burner, B, with a chimney, C, of glass or other transparent substance. This lamp-body A is quite low, or it would be preferable to have it so, in order to keep the device within moderate limits in a vertical direction. This lamp, when the device is in use, is fitted within the lower part of a frame of slightly conical form, composed of an upper ring, $a$, and a lower ring, $b$, connected by standards $c$—three or more. These rings and standards may be of wire, connected together by solder, or otherwise; and the frame serves as a support for the upper portion of the stove, composed of an inverted conical vessel, D, within which there is placed a conical tube, E. This vessel and tube are constructed of sheet metal, and are connected at their lower ends by solder; the diameter of said ends being equal. The vessel D is fitted in the upper ring $a$ of the frame, the lower ends of the former extending some distance below the latter, as shown in fig. 1, and the lamp-chimney C extending up within the conical tube E. The upper end of the conical tube E is notched or serrated, as shown at $a^\times$, to admit of the lateral escape of the products of combustion from said tube, and openings $d$ are made in the upper part of the vessel D for their escape. The substance to be heated is put in a cup or vessel, which is placed on the top of the vessel D; and if necessary, or desired, a plate may be placed on D, perforated, and having pendent projections, to cause the draught to have a circuitous route under the cup or vessel containing the substance to be heated. $E^\times$ represents a reflector, which may be constructed of sheet metal, and having its sides bent or curved to fit around two of the standards $c$. This reflector serves to render a portion of the apartment shaded, while it will reflect the light in an opposite direction; and the shade and light, by turning the device, may be directed as desired. In order to retain the heat more effectually, the vessel D may have sand or any suitable non-conducting material placed in it; said vessel being about half filled.

Having thus described my invention, I claim as new, and desire to secure by Letters Patent—

1. The combination of the lamp-chimney C, heating vessel D, tube E, and skeleton frame $c$, arranged and operating in the manner and for the purpose herein specified.

2. In combination with the above I claim the reflector $E^\times$, constructed and applied in the manner herein represented and described.

LUKE A. PLUMB.

Witnesses:
  G. W. WEYMOUTH,
  J. E. BUTLER.